UNITED STATES PATENT OFFICE.

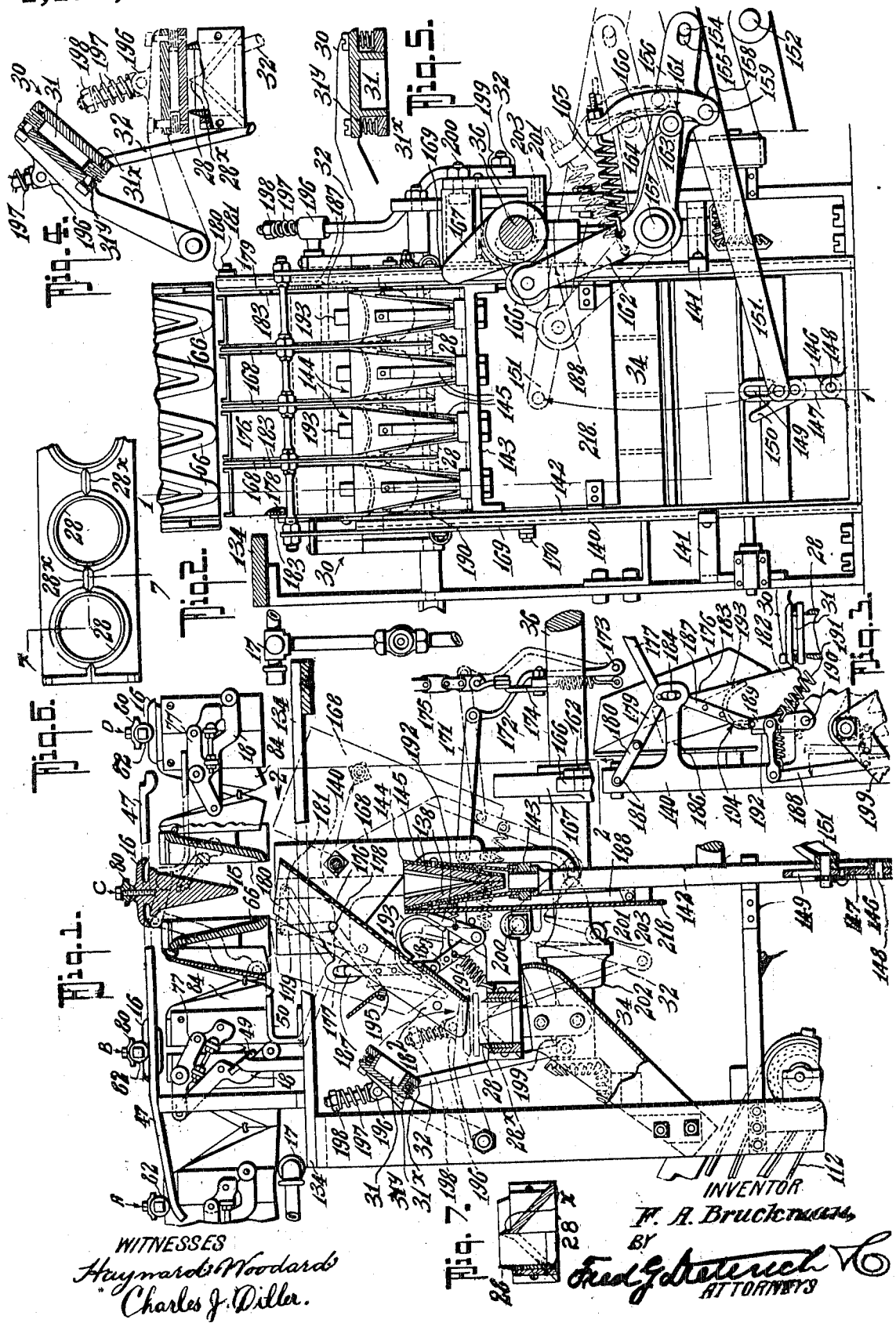

FREDERICK A. BRUCKMAN, OF PORTLAND, OREGON.

ICE-CREAM-CONE-TRIMMING MECHANISM.

1,119,239.  Specification of Letters Patent.  Patented Dec. 1, 1914.

Original application filed July 18, 1912, Serial No. 710,116. Divided and this application filed June 5, 1913. Serial No. 771,863.

*To all whom it may concern:*

Be it known that I, FREDERICK A. BRUCK-MAN, residing at Portland, in the county of Multnomah and State of Oregon, have invented a new and useful Improvement in Ice-Cream-Cone-Trimming Mechanism, of which the following is a specification.

My invention relates to machines for manufacturing ice cream cones and it has particular relation to that portion of the mechanism which is employed for trimming the mouths of the cones after they have been molded and baked.

Generically the invention provides tubular trimming cutters to which the cones are delivered from the molding devices by a chute, the cones being pressed through the cutters by a pusher which comes into operation at predetermined times, means being provided for removing the chute out of the path of the pusher after the cones have been delivered into the cutter.

This application is a divisional part of my application filed July 18, 1912, No. 710,116.

The invention also includes a special type of pusher and it further includes those novel details of construction, combination and arrangement of parts, all of which will be first fully described and then be specifically pointed out in the appended claims, reference being had to the accompanying drawing, in which:—

Figure 1 is an elevation and part section on the line 1—1 of Fig. 2. Fig. 2 is a cross section on the line 2—2 of Fig. 1. Fig. 3 is a detail side elevation of a part of the chutes and trimmer showing one way of supporting the lower chute section and the upper chute section to coöperate in moving from their normal positions to their receded positions. Fig. 4 is a detail enlarged section of the cone pusher shown in its trimming position in dotted lines. Fig. 5 is a detail section of the trimmer head, showing the integral cylindrical portion for pressing the cone through the circular trimming knives. Fig. 6 is a plan view of a portion of the cylindrical knives frame. Fig. 7 is a section on the line 7—7 of Fig. 6.

In the drawings in which like numerals and letters of reference indicate like parts in all the figures, 134 designates the upper table part of the supporting frame of the machine on which the unlocking devices 49 and 50, and the relocking devices (not shown) are mounted, that coöperate with the female mold section locking and unlocking levers 18 and 77.

15 are the cores which are carried on the ends 80 of the core carrying levers and 66 designates the female mold sections which coöperate with the core 15 to mold the cone between them.

84 designates the oven sides which are carried by the female mold members 66 while the oven cover 16 is carried by the cores 15 or their supporting arms.

47 is the lifting device which coöperates with the rollers 82 to raise the cores 15 in the female mold sections and strip the cones therefrom before the female sections open up to discharge the cones, and A, B, C and D designate, in Fig. 1, the four positions of the molds with relation to the discharge of the molded product and the reloading of the molding device. At position A, the molds are closed and locked and the product in the same has been baked. As the molding device is moved from the position A to position B, the cores are lifted in the female mold sections to strip them from the molded product and the mold sections are unlocked, but not separated a sufficient distance to discharge the product. When the molding devices arrive at position C, the female mold sections will be fully opened to discharge the molded product and when they arrive at position D the female sections will again be locked, and it is at this position that the molding devices are reloaded by a mechanism which forms no part of the present application, and is therefore not herein disclosed.

The heating burners are indicated by the reference character 17.

Upon a suitable supporting frame 140, which is provided with guides 141, is vertically slidably mounted a frame 142 which lies radially to the pivotal center of the wheel (not shown) which carries the molding devices or, in other words, the frame 142 lies in the plane of the set of cores 15 when they are in position C. The frame 142 has a cross bar 143 on which the oilers 144 are carried by resilient arms 145. The oilers 144 are composed of sections, each of which is mounted on an arm 145 and the sections may be lined with an absorbent pad 138 to retain the lubricant. The frame 142 is vertically reciprocated at proper times by a mechanism best shown in Fig. 2 of the drawings, by reference to which it will be observed that the bottom of the frame 142 is provided with a lug 146 to which a link 147 is pivoted, at 148, the link being slotted at 149.

150 is a latch pivoted to the link 147, which latch coöperates with the pin 153 that moves in the slot 149 to connect the link 147 with the lever 151. The lever 151 is pivoted at 152 at a fixed place and carries a pin 154 which projects into the slot 155 at the end of a rocking arm 156 that normally forms a part of the bell crank lever 162—163. The arm 156 and the bell crank lever 162—163 are both pivoted on a stub shaft 157 to have movement independent of one another. The arm or lever 156 has a projection 158 carrying a stud 159 on which the arc finger 160 is pivoted. The arc finger 160 has a recess 161 to receive the roller 164, that is carried on the end of the short arm 163, of the bell crank, and the finger 160 is continuously held in contact with the roller 164 by a spring 165. The roller 164 normally seats in the recess 161 to thereby cause the bell crank 162—163 and the arm or lever 156 to move as one under normal conditions. The long arm 162 of the bell crank carries a roller 166 which coöperates with the cam 167 on the main shaft 36 of the machine.

168 designates a set of partition wings or vanes which are carried by arms 169 that are pivoted at 170 to the frame 140 and the wings 168 are moved from their normal position shown in full lines in Fig. 1 to their withdrawn position shown in dot and dash lines in Fig. 1, through the medium of a lever 172, pivoted at 173, and connected to the wings of a connecting rod 171. When the transversely positioned arm 174 is drawn up by the chain 175 which in turn is connected to an intermittently rotating part of the machine (not shown) the lever 172 and wings 168 will be drawn out as previously explained.

All of the foregoing specifically described parts may be of the same construction and operate in the same way as the corresponding parts set forth in my original application hereinbefore referred to, as they, *per se*, form no part of the present invention.

176 designates the upper section of the chute that conveys the cones from the molding devices to the trimmer knives 28. The chute section 176 is pivoted at 178 to a bell crank 177—179, such bell crank being linked by a link 180 to a fixed pivot 181 on the frame 140 and the long arm 177 of the bell crank carries a stop rod or finger 195 for a purpose hereinafter made clear.

182 is the lower chute section to one side of which is riveted an arm 187 having a laterally extended lug 184, movable in a slot in the side supporting arm 186 of the frame 140. The lower chute section 182 is overlapped, as at 194, by the upper chute section 176. The sides, however, which carry the wings 183 form continuations of the wings 168 when the parts are in the normal full line positions shown in Fig. 1.

189 designate levers fixedly mounted on a pivoted shaft 190, on which levers 192 are also loosely mounted. The levers 189 are pivoted to the connecting rods 187, one of the levers 189 being linked to a vertically pivoted lever 188, which in turn is linked to the bell crank 199 as shown in Figs. 1 and 3, while the levers 192 are connected at 193 with the lower extremities of the upper chute section 176 and thereby form a support for the same. A spring 191 continuously tends to pull the shaft 190 in a clockwise direction in Fig. 3, or counter-clockwise direction in Fig. 1.

30 designates the pusher which carries a yieldable spring member, $31^x$—$31^y$ through circular openings in which plungers 31 are adapted to project when the pusher is in its down position as shown in Fig. 4 so as to force the cones through the trimming knives 28 and cause them to be discharged on the lower stationary chute 34 by which they are directed to the elevating conveyer 112. The pusher 30 has a connecting rod 32 which passes through a bearing lug 196 and carries a spring 197 and check nut 198. The rod 32 pivots to a bell crank 199 which is pivoted at 200 and has its short arm provided with a roller 201 to coöperate with the cam 203 whose hub 202 is secured on the main shaft 36.

$28^x$ are radial cutting members which serve to cut the trimmings into halves so that they may drop clear of the knives 28.

So far as described, the manner in which my invention operates will be best explained as follows: Assume the parts to be in the full line position indicated in Fig. 1 of the drawings. As the molding devices reach position C, the cones are dropped into the chute 176—182 and fall down until they engage the finger or cross wire 195, by which they are momentarily held. As soon as this act has occurred, (it being understood of course that the molding devices are now stationarily located with the open one at position C) the rod 174 and lever 172 come into operation to withdraw the partition wings 168 into the dot and dash line position shown in Fig. 1, after which the cam 167 comes into operation to cause the frame 142 to be elevated to bring the oiling cups 144 into engagement with the cores 15 to oil the same. As the frame 142 rises, the back plate 218 which is carried by the frame 142, engages the underside of the upper chute section 176 and tends to move it upwardly, as the chute section, however, is secured through the connection 180 to pivot at 181, it will move in a counter-clockwise direction on such pivot 181 until it arrives at the dot and dash line position shown in Fig. 1. In moving from the full line position shown in Fig. 1 to the dot and dash line position shown in Fig. 1, or the full line position shown in Fig. 2, the upper chute section 176 will cause the bell crank 177—179 to be operated to raise the finger 195 upwardly and permit the cones to move into the knives 28. As this occurs, the chute 182 will be brought into the position shown in full lines in Fig. 3, since at this time the cam 203 comes into operation to move the bell crank 199 to bring the pusher 30 down into the dot and dash line position in Fig. 1, thereby pushing the cones through the trimmer 28 and depositing them on the chute 34 together with the trimmings, and since the rod 188 is linked to the bell crank 199 and also to the lever 189, the first said action of moving the chute 182 is accomplished. After the frame 142 has moved upwardly, it comes down again to its initial position and in coming down, the upper chute section 176 is released and is brought back by the spring 191 to the full line position shown in Fig. 1. At the same time, the chute section 182 is restored to the full line position in Fig. 1 by the tension of a spring, connected to lever 192, its backward movement being limited by the contact of the upper chute section 176 with the lower section 182, so positioning the parts as to be ready for the next operation. As soon as the frame 142 has dropped to its initial position, the arm 174 will recede to move the cam lever 172 in a direction to restore the wings 186 to their initial position between the sections of the chute 176.

While for convenience of illustration I have described the molding devices and the oiling device, I make no claim thereto *per se*, or in combination with the trimming mechanism broadly, as such forms the subject matter of my original application above referred to, the claims of the present application being directed to the trimming mechanism *per se*, and the same in combination with the chute and a mechanism for moving the chute into and out of position to permit the action of the trimming mechanism pusher.

From the foregoing description taken in connection with the accompanying drawings, it is thought the complete construction, operation and advantages of the invention will be apparent to those skilled in the art to which it appertains.

What I claim is:—

1. In a machine of the class described, the combination with the fixedly held tubular cutting knife and the means for forcing the cones through the cutting knife, said means being normally adapted to lie in an inoperative position away from the knife, of a chute for delivering the cones to the knife and means for first moving the chute out of the path of the forcing means and subsequently cause said forcing means to act in the performance of its function.

2. The combination with the tubular trimming knives and the pusher for pushing the cones through the knives, of a chute for delivering the cones to the knives, which chute normally projects into the path of movement of the pusher, and means for moving the chute out of the way and actuating said pusher.

3. The combination with the trimming knives and the means for passing the cones through the knives, of a chute for delivering the cones to the knives which chute normally projects into the path of movement of said cone passing means, and mechanism for moving the chute out of the way and actuating said passing means.

4. The combination with the trimming mechanism, which includes a movable element and a stationary element, of means for conveying the cones to the stationary element and normally projecting into the path of movement of said movable element, and means for moving said conveying means to an inoperative position and actuating said movable element.

5. In a machine of the class described, the combination with the trimming devices, of a chute for conveying the molded product to the trimming devices, said chute including a set of sections, and means for moving said chute sections out of position and then operating said trimming devices.

6. In a machine of the class described, the combination with the trimming devices, including relatively fixed tubular knives, and a movable pusher for forcing the cones through the knives, of a chute for conveying the molded product into the knives, said chute including a plurality of sections, one of which projects over the knives into the path of movement of the pusher, means for arresting the cones in their movement through the chute to aline them for entry into the knives, means for first removing said arresting means to trim said cones to drop into said knives, and upon further movement move said chutes out of the way to trim said pusher to be actuated.

7. In a machine of the class described, the combination with the trimming devices, including relatively fixed tubular knives, and a movable pusher for forcing the cones through the knives, of a chute for conveying the molded product into the knives, said chute including a plurality of sections, one of which projects over the knives into the path of movement of the pusher, means for arresting the cones in their movement through the chute to aline them for entry into the knives, means for first removing said arresting means to trim said cones to drop into said knives, and upon further movement move said chutes out of the way to trim said pusher to be actuated, and means for operating said pusher to force the cones through said knives while said chute is out of the way.

FREDERICK A. BRUCKMAN.

Witnesses:
O. S. FULTON,
L. HERSHNER.